United States Patent

Lee et al.

[11] Patent Number: 6,146,241
[45] Date of Patent: Nov. 14, 2000

[54] APPARATUS FOR UNIFORM CHEMICAL MECHANICAL POLISHING BY INTERMITTENT LIFTING AND REVERSIBLE ROTATION

[75] Inventors: Michael G. Lee, San Jose; Solomon I. Beilin, San Carlos, both of Calif.

[73] Assignee: Fujitsu Limited, Japan

[21] Appl. No.: 08/967,968

[22] Filed: Nov. 12, 1997

[51] Int. Cl.⁷ ................................................. B24B 49/00
[52] U.S. Cl. .................................. 451/5; 451/11; 451/24; 451/159; 451/288
[58] Field of Search .................................. 451/5, 11, 19, 451/21, 24, 158, 159, 173, 285, 286, 287, 288, 289, 290, 398; 364/474.06

[56] References Cited

U.S. PATENT DOCUMENTS

| | | |
|---|---|---|
| 3,582,740 | 6/1971 | Reinert . |
| 3,815,226 | 6/1974 | Marrie . |
| 3,857,123 | 12/1974 | Walsh ...................................... 451/284 |
| 3,977,130 | 8/1976 | Degner . |
| 4,193,226 | 3/1980 | Gill, Jr. et al. . |
| 4,422,029 | 12/1983 | Demers et al. . |
| 4,886,990 | 12/1989 | Barker . |
| 4,910,155 | 3/1990 | Cote et al. . |
| 4,918,870 | 4/1990 | Torbert et al. . |
| 5,020,283 | 6/1991 | Tuttle . |
| 5,104,828 | 4/1992 | Morimoto et al. . |
| 5,113,622 | 5/1992 | Nishiguchi ........................... 451/288 X |
| 5,142,828 | 9/1992 | Curry, II . |
| 5,216,843 | 6/1993 | Breivogel et al. . |
| 5,232,875 | 8/1993 | Tuttle et al. . |
| 5,234,867 | 8/1993 | Schultz et al. . |
| 5,297,364 | 3/1994 | Tuttle . |
| 5,299,393 | 4/1994 | Chandler et al. . |
| 5,377,451 | 1/1995 | Leoni et al. . |
| 5,384,986 | 1/1995 | Hirose et al. . |
| 5,403,228 | 4/1995 | Pasch . |
| 5,441,444 | 8/1995 | Nakajima . |
| 5,443,416 | 8/1995 | Volodarsky et al. . |
| 5,476,414 | 12/1995 | Hirose et al. . |
| 5,487,697 | 1/1996 | Jensen . |
| 5,498,196 | 3/1996 | Karlsrud et al. . |
| 5,498,199 | 3/1996 | Karlsrud et al. . |
| 5,542,874 | 8/1996 | Chikaki . |
| 5,816,895 | 10/1998 | Honda .................................. 451/288 X |
| 5,851,135 | 12/1998 | Sandhu et al. ...................... 451/288 X |

FOREIGN PATENT DOCUMENTS

| | | |
|---|---|---|
| 62-22747B | 5/1987 | Japan . |
| 62-99073A | 5/1987 | Japan . |

*Primary Examiner*—Timothy V. Eley
*Attorney, Agent, or Firm*—Coudert Brothers

[57] ABSTRACT

Methods and apparatuses for evenly polishing the entire polishing surface of a sample are described. One polishing apparatus of the present invention comprises: a platen having an upper surface upon which the sample surface is to be polished; a sample holder disposed opposite to the platen's upper surface, at least one of the platen and the sample holder being rotated about a first axis to effect polishing; a positioning means for changing the distance between the sample holder and the platen in response to a control signal; and a controller providing said control signal to the positioning means to control the operation of the positioning means during a polishing cycle, wherein the controller causes the positioning means to change the distance intermittently during the polishing cycle. One method according to the present invention comprises: dispensing slurry upon a polishing pad; polishing the sample against the polishing pad; and intermittently changing the distance between the sample and the polishing pad during the polishing step.

24 Claims, 7 Drawing Sheets

| | INSTRUCTION TYPE | TIME PERIOD (SEC) | DISENGAGE AT BEG. | MOTOR ASSEMBLY 132 | | MOTOR ASSEMBLY 134 | |
|---|---|---|---|---|---|---|---|
| | | | | ON/OFF | DIRECTION | ON/OFF | DIRECTION |
| 1. | S.C. | 30 | YES | ON | C.W. | ON | C.C.W. |
| 2. | S.C. | 30 | YES | ON | C.W. | ON | C.C.W. |
| 3. | S.C. | 30 | YES | ON | C.C.W. | ON | C.W. |
| 4. | S.C. | 30 | YES | ON | C.C.W. | ON | C.W. |
| 5. | F.C. | REPEAT AGAIN FROM | | REPEAT INSTRUCTION | INSTRUCTION #1 | REPEAT COUNT | 2 TIMES |
| 6. | S.C. | 30 | YES | ON | C.W. | ON | C.C.W. |
| 7. | S.C. | 30 | YES | ON | C.C.W. | ON | C.W. |
| 8. | S.C. | 30 | YES | ON | C.W. | ON | C.C.W. |
| 9. | S.C. | 30 | YES | ON | C.C.W. | ON | C.C.W. |
| 10. | F.C. | END | | | | | |

APPARATUS FOR UNIFORM CHEMICAL MECHANICAL POLISHING BY INTERMITTENT LIFTING AND REVERSIBLE ROTATION

FIELD OF THE INVENTION

The present invention relates to chemical mechanical polishing. More specifically, the present invention relates to apparatuses and methods for uniformly polishing the surface of a sample.

BACKGROUND OF THE INVENTION

Chemical mechanical polishing (CMP) has been increasingly used in the semiconductor fabrication industry to planarize the surfaces of integrated circuit chips, thin-film substrates, and thick-film substrates one or more times during the fabrication process. For this purpose, two major objectives are sought: good local planarity of the polished surface in the vicinity of the integrated circuit chip, and good global planarity of the polished surface from one edge of the wafer (or substrate) to the other. It is known that the degree of hardness of the polishing pad affects both the local and global planarity. A hard polishing pad typically has good global planarity, but poor local planarity, whereas a soft polishing pad typically has good local planarity, but poor global planarity.

The inventors have observed that the periphery of the wafer is polished more than the interior of the wafer. It was initially thought by the inventors that this effect was due to the leading edge of the wafer carrier digging into a soft polishing pad while it is being rotated during the polishing process. Attempts to remedy this problem by increasing the hardness of the pad have not been wholly successful.

Accordingly, there is a need to address this uneven polishing problem.

SUMMARY OF THE INVENTION

In their invention, the inventors have recognized that by the time the polishing slurry reaches the inner portion of the wafer sample, the abrasive particles of the slurry are rubbed into finer sizes and/or pressed into pores in the polishing pad by the outer periphery of the wafer sample. Both of these effects reduce the polishing slurry's effectiveness in polishing the inner portion of the wafer sample. The inventors have observed that the uneven polishing problem is made worse by reducing the flow rate of slurry onto the platen, but only marginally improved by increasing the slurry flow rate.

The present invention encompasses methods and apparatuses for evenly polishing the entire polishing surface of a sample by intermittently separating the polishing sample from the polishing pad during the polishing process, and preferably while slurry is being dispensed, and by intermittently reversing the rotation direction of either or both of the sample holder and the platen. The intermittent separation of the sample and the pad enables the interior of the polishing sample to be polished by fresh (i.e., unused) slurry, and the reversal of rotation directions helps to dislodge slurry particles that have been pressed into the pores of the polishing pad.

Broadly stated, polishing apparatuses according to the present invention comprise a platen having an upper surface to which a polishing pad is attached and upon which the sample surface is to be polished, a sample holder disposed opposite to the platen's upper surface with at least one of the platen and the sample holder being rotated about a first axis to effect polishing, a slurry dispenser, and a positioner which changes the distance between the sample holder and the platen in response to a control signal. Polishing apparatuses according to the present invention may further comprise a controller which generates one or more of the following control signals: (1) a control signal to the positioner which is generated to cause the positioner to intermittently separate the polishing sample from the polishing pad a plurality of times during the polishing cycle, (2) a control signal to the motor assembly that rotates the sample carrier which is generated to cause the sample holder to intermittently reverse rotation directions at least once during the polishing cycle; and (3) a control signal to the motor assembly that rotates the platen which is generated to cause the platen to intermittently reverse rotation directions at least once during the polishing cycle.

Broadly stated, methods according to the present invention comprise the steps of: dispensing slurry upon a polishing pad, polishing the sample against the polishing pad, and taking one or more of the following steps during the polishing step: (1) intermittently changing the distance between the sample and the polishing pad a plurality of times during the polishing step (e.g., polishing cycle), (2) intermittently changing the rotation direction of the sample a plurality of times during the polishing step, and (3) intermittently changing the rotation direction of the platen a plurality of times during the polishing step.

Accordingly, it is an object of the present invention to evenly polish the entire polishing surface of a sample.

These and other objects of the present invention will become apparent to those skilled in the art from the following detailed description of the invention, the accompanying drawings, and the appended claims.

DETAILED DESCRIPTION OF THE INVENTION

Figure 1:
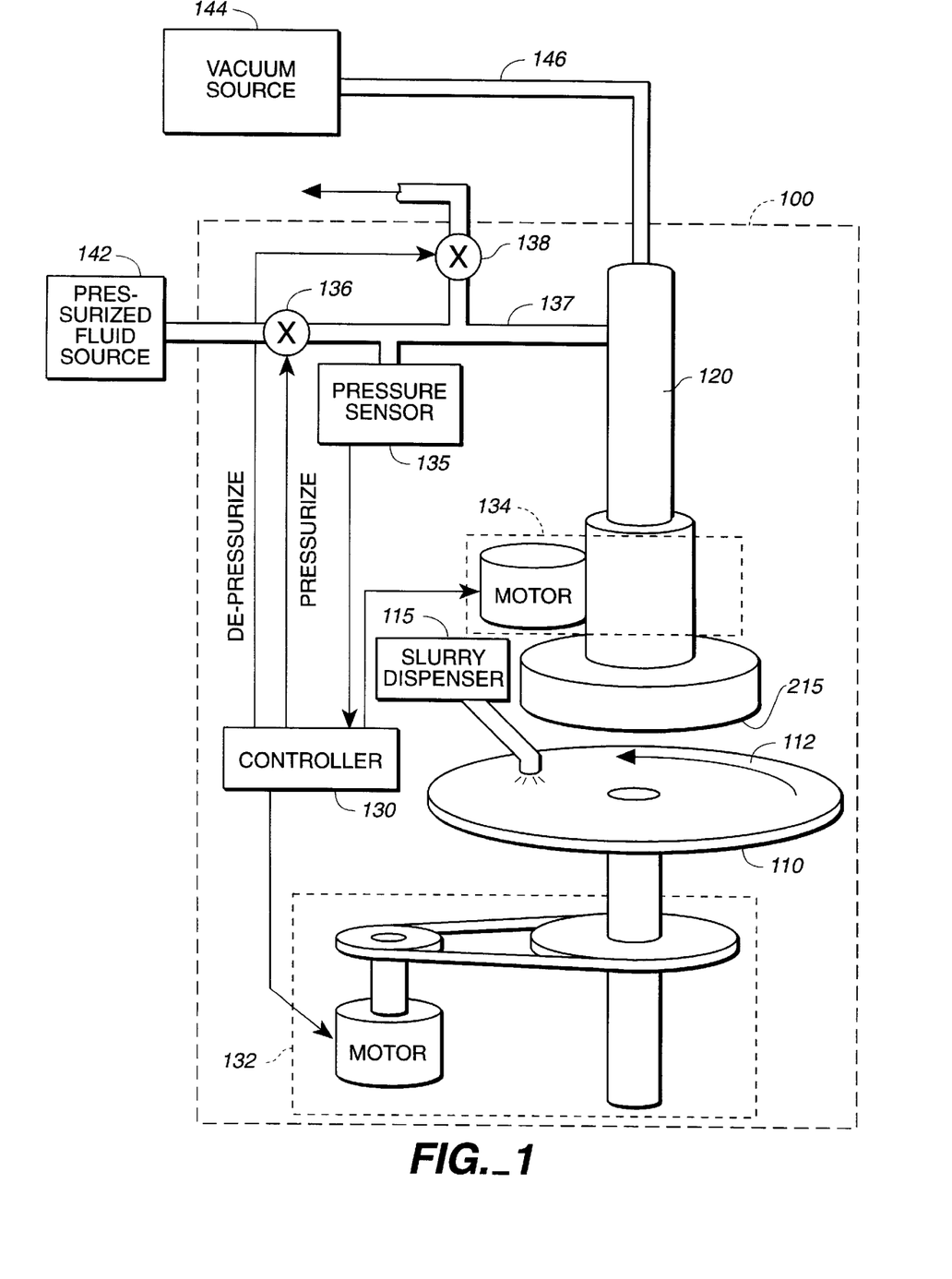
FIG. 1 is a mixed block-schematic diagram of an exemplary polishing apparatus according to the present invention.
Figure 2:
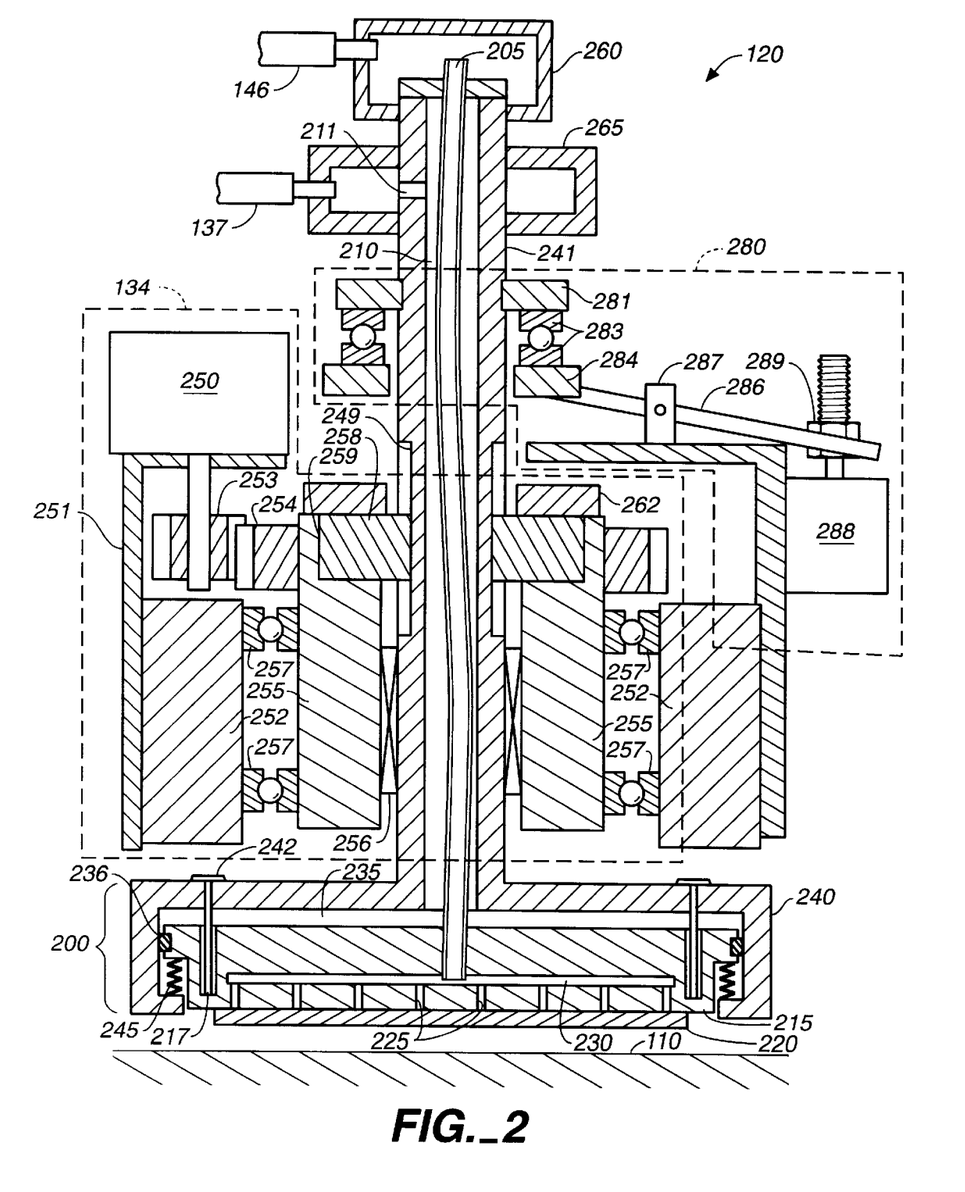
FIGS. 2 and 3 are cross-sectional views of an exemplary positioner and sample holder according to the present invention.

FIG. 1 is a mixed block-schematic diagram of an exemplary polishing apparatus 100 according to the present invention. Polishing apparatus 100 comprises a platen 110, a polishing pad 112 disposed on platen 110, and a slurry dispenser 115 which dispenses slurry onto pad 112. The polishing surface of a sample is polished upon the upper surface of platen 110 by being polished against polishing pad 112 or an equivalent thereof for purposes of polishing a sample. To hold the polishing sample, apparatus 100 further comprises a sample holder 215 which holds a polishing sample 220 (best shown in FIGS. 2 and 3), and a positioner 120 which holds sample holder 215 opposite to platen 110, and which moves it and polishing sample 220 to contact the sample to the polishing pad on platen 110. As is common in the wafer polishing art, sample holder 215 holds sample 220 against its surface though the use of a vacuum, which is supplied to holder 215 by a vacuum source 144 through a conduit 146. Referring to FIG. 2, which shows a cross-sectional view of positioner 120, the vacuum is provided from conduit 146 to sample holder 215 by a tube 205 which passes through a rotating shaft 241 of positioner 120. The upper end of tube 205 is coupled to conduit 146 through a rotating fluid coupling 260. The lower end of tube 205 is coupled to a connecting space 230 within sample holder 215, which is in turn coupled to a plurality of vacuum ports 225 formed from connecting space 230 to the holding surface of sampled holder 215. Vacuum source 144 creates a negative pressure within tube 205, connecting space 230 and vacuum ports 225. When the suction force on a sample 220 due to the negative pressure within vacuum ports 225 exceeds the weight of sample 220, then sample 220 is held in contact with the sample holder 215, as shown in FIG. 2.

Referring back to FIG. 1, polishing apparatus 100 further comprises a controller 130, a first motor drive assembly 132, and a second motor drive assembly 134. Motor drive assemblies 132 and 134 rotate platen 110 and positioner 120, respectively, about first and second axes, respectively. Motor drive assemblies 132 and 134 are responsive to direction control signals received from controller 130 and rotate platen 110 and positioner 120, respectively, in either the clockwise or counterclockwise direction based on the direction control signals they receive. Platen 110 and/or positioner 120 are rotated about a first axis, such that one of the platen and the positioner is rotated with respect to the other, to effect polishing a sample held by the sample holder 215. Motor drive assemblies 132 and 134 are also responsive to ON/OFF control signals from controller 130 which instruct the motor drive assemblies whether or not to turn their respective components. These signals, for example, enable one of the platen or the sample holder to remain fixed while the other rotates.

Referring to FIG. 2, positioner 120 comprises a rotating outer frame 240 which receives sample holder 215, and a rotating shaft 241 which is attached to, or integrally formed with, housing 240. As described in greater detail below, shaft 241 is rotated by motor drive assembly 134, which in turn drives housing 240. To rotate sample holder 215, housing 240 comprises a plurality of pin members 242 which fit into corresponding apertures 217 having slightly larger diameters. The pin members 242 lock the rotational motion of sample holder 215 to that of housing 240, but enable sample holder 215 to freely move in the vertical axis, and to tilt in the horizontal axes at small angles if polish sample 220 is tapered. If desired, apertures 217 may be lined with TEFLON sleeves to reduce friction. Also if desired, pin members 242 may include ball-shaped ends to enable a greater range of horizontal tilt. In such a case, apertures 217 may be lined with needle bearings or roller bearings.

Positioner 120 further comprises a course position adjuster 280, which is described in greater detail below, and a fine position adjuster, which is generally indicated at number 200 in FIG. 2. Fine adjuster 200 preferably comprises an expandable fluid chamber 235 positioned above sample holder 215. The volume of fluid chamber 235 is defined by the upper surface of sample holder 215, the lower surface of outer frame 240, and the inner sidewalls of frame 240. An O-ring 236, or sealing member, is disposed between sample holder 215 and the inner sidewalls of frame 240 in a grooved recess of holder 215. O-ring 236 makes chamber 235 substantially air-tight, but enables sample holder 215 to freely move in the vertical axis and to tilt in the horizontal axes. When a fluid having a pressure greater than atmospheric pressure is coupled to chamber 235, sample holder 215 is pushed toward platen 110, and chamber 235 expands. When the pressuring fluid is decoupled from chamber 235, a plurality of springs 245 disposed between sample holder 215 and housing 240 push sample holder 215 away from platen 110. In the down position, the downward pressure exerted on the upper surface of holder 215 by the fluid plus the gravitation force (i.e., weight) of sample holder 215 and sample 220 equals the upward force applied by springs 245 plus the upward force applied to sample 220 by the polishing pad.

Referring to FIG. 1, the pressurizing fluid for chamber 235 is provided by a source 142, which may for example comprise a pump or compressor. In a preferred embodiment, the pressurizing fluid is in the gaseous state and may, for example, comprise compressed air. Source 142 is coupled to chamber 235 through a pressurizing valve 136 and a conduit 137, as shown in FIG. 1, and further through a rotary coupling 265 and a bore 210 through shaft 241, as shown in FIG. 1. A side port 211 couples bore 210 to rotary coupling 265. Valve 136 is opened to couple fluid to chamber 235 to move sample holder 215 toward platen 110 until a desired position is achieved, and then valve 136 is closed to maintain the desired position. The desired position corresponds to a pressure per square centimeter within the chamber, and typically the process designer specifies the pressure per square centimeter (or other square unit) rather than the position. Once valve 136 is closed, the pressure per square centimeter within conduit 137 will be the same as the pressure per square centimeter within chamber 235 of finer adjuster 200. Thus, the desired pressure may be determined by measuring the pressure within conduit 137, and apparatus 100 includes a pressure sensor 135 for this purpose.

Figure 3:
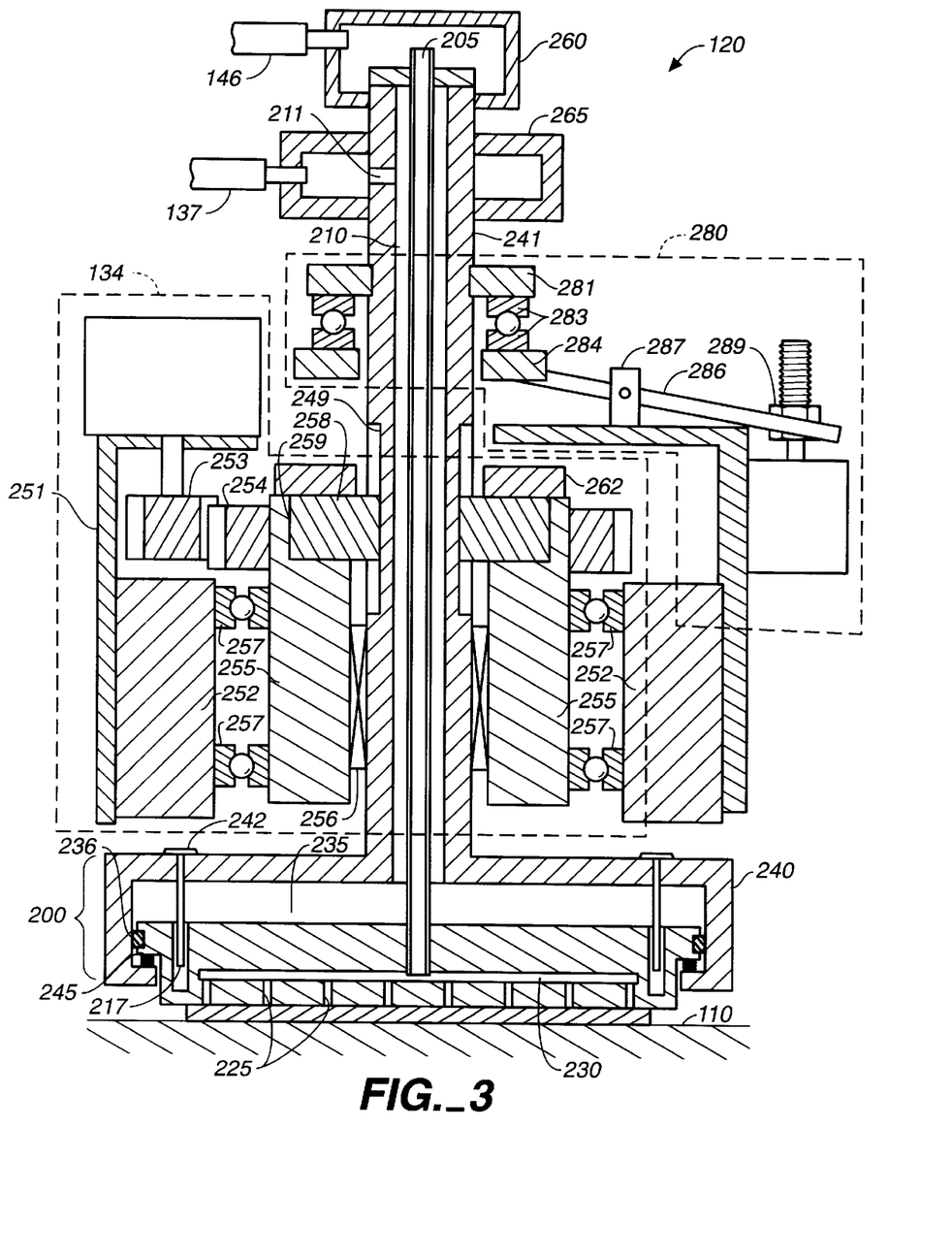

FIG. 3 shows positioner 120 with chamber 235 in a pressurized state. Tube 205 preferably comprises a flexible plastic tubing which flexes in response to the height changes of sample holder 215 (in this case, the length of tube 205 is as long as required for holder 215 to be in the fully-down position, and tube 205 relaxes and bows inside bore 210 when holder 215 is in the up position). Some fluid leakage may occur through rotary coupling 265 and O-ring 236, but valve 136 may be periodically opened and closed to replace lost fluid.

To cause sample holder 215 to move away from platen 110, apparatus 110 includes a pressure release valve 138 coupled to conduit 137, as shown in FIG. 1, which releases the pressurized fluid from the expansion chamber. When pressure is released, the springs move sample holder 215 away from platen 110. Sensor 135 provides a measurement signal to controller 130, and controller 130 provides control signals to valves 136 and 138, as shown in FIG. 1. In this way, positioner 120 causes sample holder 215 and sample 220, as held by sample holder 215, to move between the up and down positions in response to control signals from controller 130. By monitoring the valve from pressure sensor 135 while filling chamber 235 with pressurizing fluid, valve 136 may be closed, or otherwise operated, to provide a desired amount of pressure between polish sample 220 and platen 110.

Referring to FIG. 2, motor drive assembly 134 comprises a motor 250 which is attached to a stationary housing 252 by a bracket 251. A motor gear 253 is attached to the shaft of motor 250, and motor gear 253 engages with a ring gear 254 which is attached (e.g., press fitted) on a drive cylindrical 255. Drive cylinder 255 surrounds a portion of shaft 241 and is spaced therefrom by a sleeve bearing 256. A set of deep-groove bearings 257 attaches drive cylinder 255 to stationary housing 252, and enables drive cylinder 255 to rotate as it is being driven by motor 250 and ring gear 254. Drive cylinder 255 rotates shaft 241 and, at the same time, enables shaft 241 to move in the vertical direction by an amount sufficient to lower housing 240 to near contact with platen 110 and to raise it away from platen 110. The drive is accomplished by one or more keys 258, each of which securely fits into a keyset 259 of drive cylinder 255 and a keyset 249 of shaft 241. Keyset 249 has a longer length than key 258, which enables shaft 241 to freely move in the vertical direction as it is being rotated by drive cylinder 255 and keys 258. A cap member 262 may be used to lock key 258 to keyset 259.

It may be appreciated that motor drive assemblies other than that shown in FIG. 2 may be used in practicing the present invention. The only feature of the drive assembly 134 required by some of the embodiments of the present invention is that the rotation direction be reversible. While conventional CMP equipment is not designed to allow the user to reverse the rotation of the motor drive, many of these systems employ DC motors for motor 250, which can be reversed in direction by reversing the polarity of the applied voltage to the motor. The standard electrical coupling to the DC motor is replaced by one specifically designed to enable application of reverse polarity. An exemplary voltage drive circuit for DC motors is described in greater detail below with reference to FIG. 8. Many AC motors may also be similarly reversed by reversing the hot and neutral lines to the motor. While reversing the motor polarity is the more preferred way of achieving reverse rotation, it may be appreciated that reverse rotation may be achieved by mechanical components which enable the motor to only rotate in one direction. For example, an idler gear may be interposed between motor gear 253 and ring gear 254.

Referring to FIG. 2, shaft 241 is moved in the vertical direction by course positioner 280. A ring member 281 is attached to shaft 241, such as by hot press fitting, and provides a point at which positioner 280 may move shaft 241. Below ring member 281 is a stationary platform 284 which is coupled to ring member 281 by a thrust bearing 283. Thrust bearing 283 enables ring member 281 to freely rotate with respect to stationary platform 284, and enables platform 284 to move upward to move both ring member 281 and shaft 241 upward in the vertical direction against their weight. When platform 284 moves down, ring member 281 and shaft 241 move down as well, due to their weight. Stationary platform 284 is raised and lowered by a lever 286, which is attached at a fulcrum member 287. The far end of lever 286 is moved by a motor 288, which has a worm gear drive on its shaft. A corresponding nut member 289 is provided in the far end of lever 286 to receive the worm gear. Nut member 289 has a gimbal attachment to lever 286 which enables it to keep level with the worm gear drive while lever 386 sweeps through its arc of motion.

It may be appreciated that other course positioning means may be employed, such as that shown in U.S. Pat. No. 5,441,444 to Nakajima. The present invention does not require course positioner 280 since the positioning used by the present invention is provided by fine positioner 200. However, one may use course positioner 280 as a replacement or supplement to fine positioner 200 to provide the position changing used in the present invention.

Figure 5:
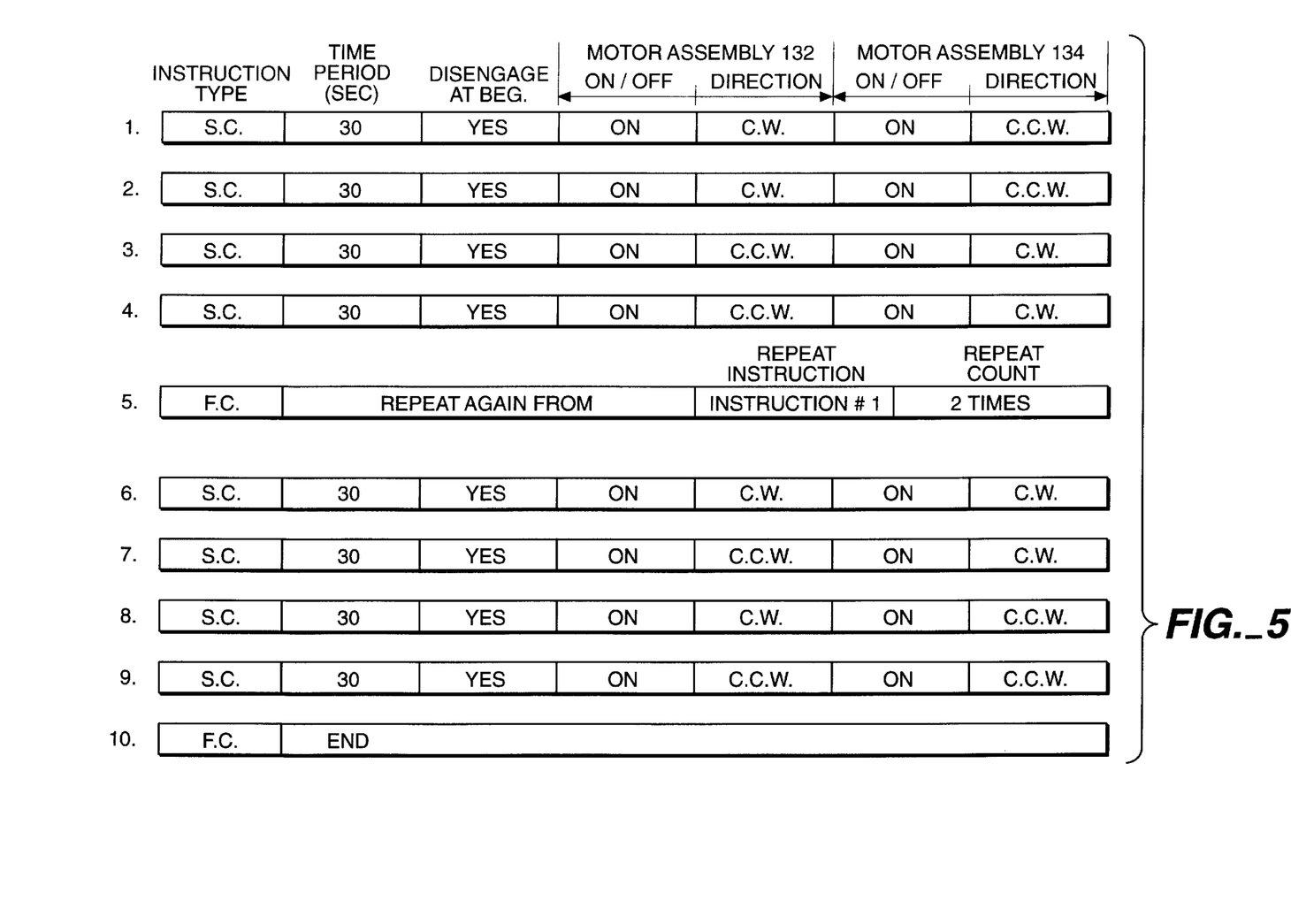
FIG. 5 is a chart of exemplary operating instructions for the motors and positioner used in the polishing apparatus of the present invention.

Referring now to FIGS. 1 and 5, based on a sequence of control instructions, such as those shown in FIG. 5, controller 130 issues control signals to motors 132 and 134 which control the rotational speed and/or direction of the motors. The control signals cause motors 132 and 134 to intermittently vary the rotational speed and direction of platen 110 and sample holder 215, respectively. Controller 130 also provides control signals to pressurizing valve 136 and release valve 138 to intermittently change the distance between the sample holder 215 and platen 110 during a polishing cycle. In response to the control signals received from controller 130, pressurizing valve 136 and release valve 138 cause a change in the distance between the platen and the sample holder 215.

Figure 4:
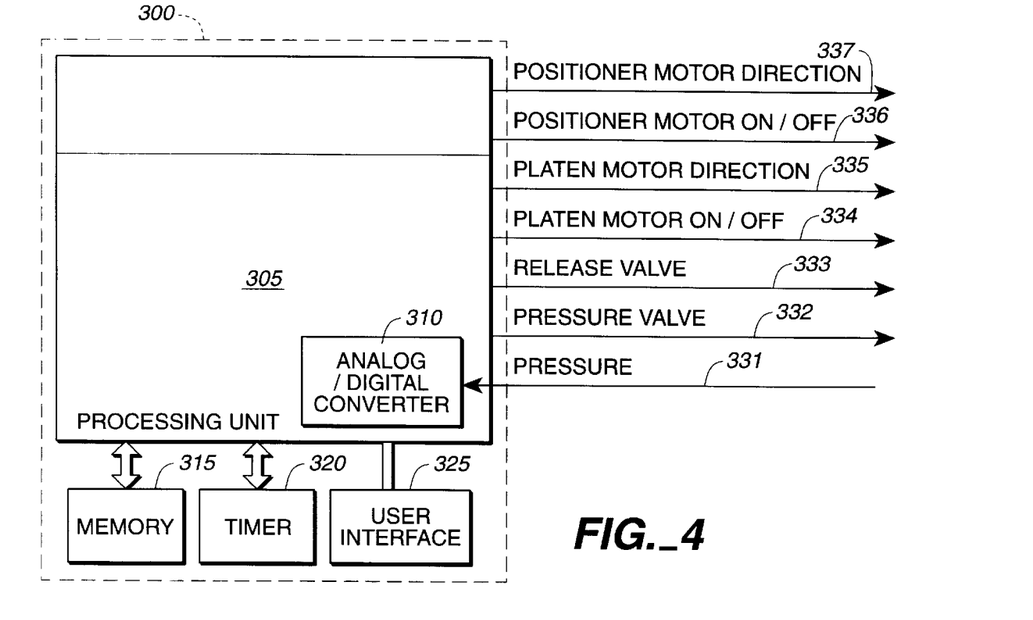
FIG. 4 is a block diagram of an exemplary controller according to the present invention.

FIG. 4 shows a block diagram of an exemplary controller 300 according to the present invention which may be used to implement controller 130. Controller 300 comprises a processing unit 305, a memory unit 315, a timer 320 and a user interface unit 325. Processing unit 305 includes analog/digital (A/D) converter 310. At port 331 processing unit 305 is supplied with information about the pressure within the positioner from sensor 135. Ports 332 and 333 are used to supply signals to control pressurizing valve 136 and release valve 138, respectively. Ports 334 and 335 are used to send ON/OFF signals and motor direction signals, respectively, to motor drive assembly 132, which drives platen 110. Similarly, ports 336 and 337 are used to send ON/OFF signals and motor direction signals, respectively, to motor drive assembly 134, which drives positioner 120 and sample holder 215. Memory unit 315 stores a sequence of instructions on the rotation speeds and directions of motor drive assemblies 132 and 134, the position of positioner 120, and the time period during which certain of the instructions are in effect. The instructions are configured by the machine operator to any desired form through user interface unit 325, which may comprise a simple operating system, such as the Disk Operating System (DOS), running a text editor and an execution program. The text editor is used to input the desired sequence of instructions into a text file, and the execution program reads the text file and generates control signals at ports 332–337 to implement the user's instructions. Such text editors are readily available on DOS and other operating systems, and the execution steps of an exemplary execution program, which may be written in the BASIC language or another computer programming language, are described below with reference to FIG. 6.

Timer 320 of controller 300 provides an electronic signal representative of time which is used by the execution program to time the length of the instructions. For ease of use, timer 320 is preferably a count-down timer. After being initially set with a value representing a desired number of seconds for the time period, a countdown timer counts down one second at a time to a value of zero, at which point it stops. The value of timer 320 may be read by processor 305 at any time. If desired, timer 320 may count down in other time units, such as for example tenths of seconds.

Processing unit 305 generates control signals at output ports 332 to 337 in response to the sequence contents of memory unit 315, the output of timer 320, and the output of pressure sensor 135, as provided in digital form by A/D converter 310. Thus, at selected times, as determined by the timer 320, processing unit 305 sends the appropriate signals to the pressure valve, the release valve, the platen motor and the positioner/sample motor in response to the signal received from the pressure sensor via terminal 331 and the corresponding control signals stored in memory unit 315.

FIG. 5 shows an exemplary sequence of instructions to be followed by an execution program of controller 305. These instructions are held in memory 315, and the instructions may be of two types: a settings-control (S.C.) instruction, and a flow-control (F.C.) instruction. Instructions 1–4 and 6–9 in FIG. 5 are settings-control (S.C.) instructions, and instructions 5 and 10 are flow-control (F.C.) instructions. An S.C. instruction specifies the settings of motor assemblies 132 and 134 and positioner 120 for a specified period of time. F.C. instructions enable the user to selectively repeat one or more groups of S.C. instructions, and to formally end a file of S.C. instructions at any point. The execution program reads these instructions from the user's file, and executes them, preferably one at a time, and preferably starting with the first instruction. The user's file may have any number of these instructions.

Referring to FIG. 5, the first field of each instruction specifies the type of instruction, S.C. or F.C. The second field of an S.C. instruction indicates the time period over which the instruction's settings are to be used, and the third field thereof indicates whether sample holder 120 is to be dis-engaged (e.g., intermittently lifted) from platen at the beginning of the S.C. instruction for a short period of time. The remaining fields of an S.C. instruction give the ON/OFF states and direction states for motor assemblies 132 and 134 during the instruction. The abbreviation C.W. indicates clockwise rotation and C.C.W. indicates counter-clockwise rotation. The second field of a flow-control (F.C.) instruction indicates the type of flow control operation, such as an instruction to repeat a previous set of S.C. instructions, or an instruction to stop the machine, which disengages the sample holder from the platen. A repeat F.C. control instruction is show at instruction #5 in FIG. 5. The third field of this F.C. instruction indicates the instruction at which the repeat operation is to start from, and the fourth field indicates how many times the repeat operation is to be done. In simple terms, F.C. instruction #5 specifies that S.C. instructions #1 through #4 are to be repeated two times before proceeding to instruction #6. An "end" F.C. instruction, such as shown at instruction #10, causes controller 300 to end the polishing process regardless of any instructions that may follow in the user's file.

Figure 6:
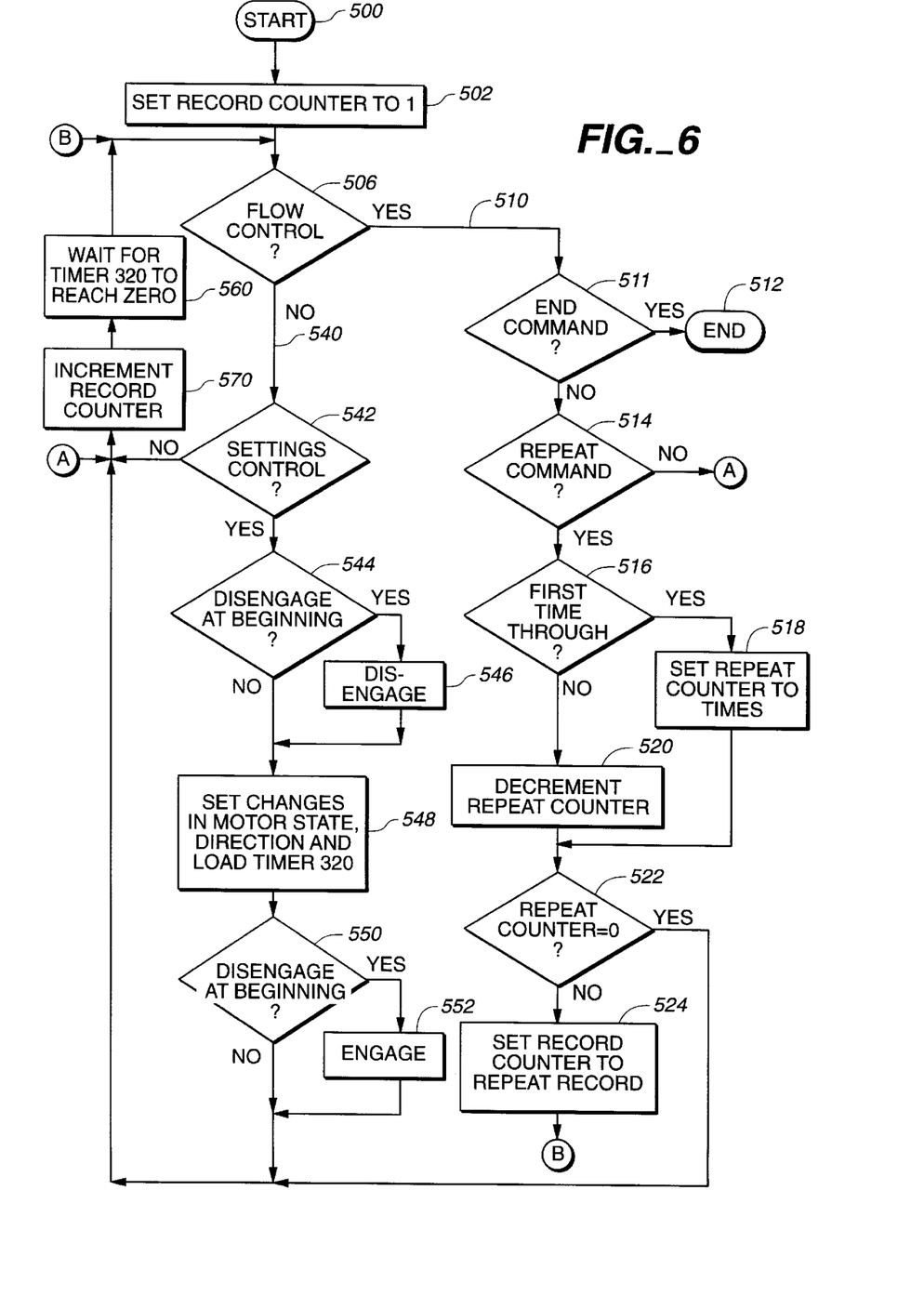
FIG. 6 is a flow chart of the operating steps executed by an exemplary controller of an exemplary polishing apparatus of the present invention.

FIG. 6 is a flow diagram of the exemplary steps which the execution program of controller 300 may use to read and execute the instructions provided in the user's file, such as that shown in FIG. 5. As shown in FIG. 6, the process starts at block 500 and proceeds to block 502, where a program register "RECORD COUNTER" in controller 300 is set to a value of 1. This register will be used to keep track of the current instruction that is being read from the instruction memory and executed by processor 300. At block 506, the current instruction is read from memory using the value of the RECORD COUNTER register. If the current instruction is a flow control (F.C.) instruction, then the execution program takes branch 510 to block 511, otherwise, it takes branch 540 to block 542. At block 511, if the instruction is an end instruction, the polishing process is ended at block 512, otherwise the execution program proceeds to block 514, where it determines whether or not the instruction is a repeat instruction. If the instruction is not a repeat instruction, the execution program presumes the instruction is in error, ignores it, and then proceeds to block 560 (via point A) to obtain the next instruction. (If new F.C. instructions are added, the processing of these new instructions may occur at point A.)

If the instruction is a repeat instruction, the execution program proceeds to block 516, where it determines whether this is the first time through block 516 for the current instruction. If it is the first time through, the execution program proceeds to block 518, where it sets a register variable "REPEAT COUNTER" to the number of times indicated in the fourth field of the repeat instruction. If it is not the first time through, the execution program proceeds to block 520, where it decrements the current value of the register variable REPEAT COUNTER by one. Both of blocks 518 and 520 proceed to block 522, where the execution program determines whether the register variable REPEAT COUNTER equals zero. If REPEAT COUNTER equals zero, then the execution program proceeds to block 560 to obtain the next instruction following the current instruction (e.g., to get instruction #6 after passing through instruction #5 for the last time). If REPEAT COUNTER is not zero, the execution program proceeds to block 524, where it sets the variable register RECORD COUNTER to the value in the third field of the repeat instruction, which is the identity (e.g., number) of the instruction from which the repeating operation is to start. From Block 524, the execution program goes to block 506 to determine the instruction type of repeat instruction now held by RECORD COUNTER.

The settings-control (S.C.) instructions are processed by the execution program starting at block 542, as indicated above. At block 542, it is determined whether the record is an S.C. instruction. If the instruction is not an S.C. instruction, the execution program presumes the instruction is in error, ignores it, and then proceeds to block 560 (via point A) to obtain the next instruction. If the record is an S.C. instruction, the execution program proceeds to block 544, where it reads; from the third field of the instruction whether there should be a disengagement of the sample holder from the platen (e.g., whether the sample holder should be intermittently lifted) at the beginning of the instruction. If so, the sample holder is disengaged at block 546. In either case, the execution program proceeds to block 548, where the appropriate changes in the motor state and direction are set for both the positioner motor and the platen motor, and where the time period for the instruction is loaded into timer 320. Exemplary steps for block 548 are described below with reference to FIG. 7. After executing the steps of block 548, motor assemblies 132 and 134 are set in motion according to the settings of the S.C. instruction. Next, at block 550, the execution program determines whether the sample holder is to be disengaged at the beginning of the instruction, as specified in the third field of the S.C. instruction (this is the same determination as made in block 544). If so, the execution program proceeds to block 552, where it waits a few seconds before engaging the sample holder. This time delay, which may be between 2 and 10 seconds, enables motor assembly 134 to rotate platen 110 and cause fresh slurry to be spread over platen 110 before the sample holder is reengaged. From blocks 550 and 552, the execution program proceeds to block 560, where the RECORD COUNTER is incremented to obtain the identity of the next instruction.

Before proceeding from block 560 back to block 506, the execution program of processor 305 executes block 570, where it waits for timer 320 to count down the time period for the current instruction (e.g., wait for timer 320 to reach zero). This time was set back in block 548. If the current instruction is a flow-control (F.C.) instruction, no time was entered in timer 320, and its value is already zero. Therefore, F.C. instructions do not incur a time delay at block 570.

Figure 7:
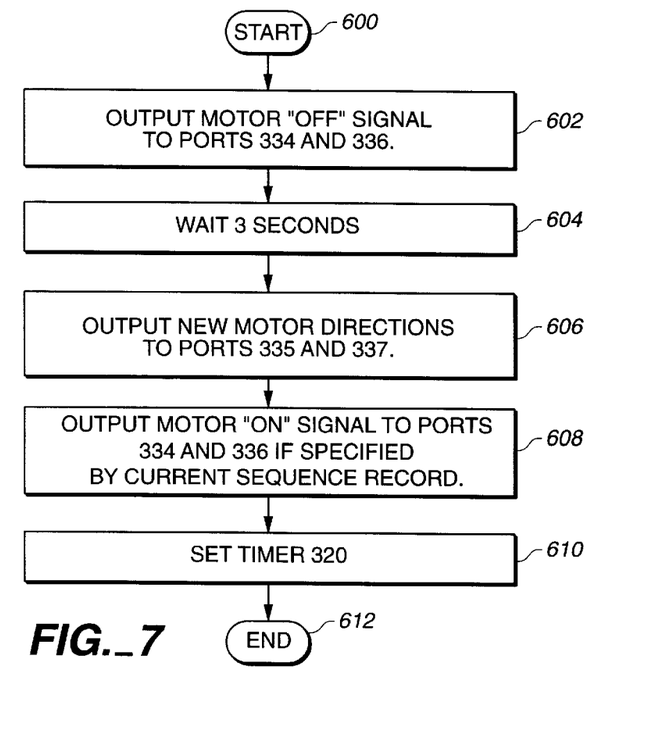
FIG. 7 is a flow chart of exemplary operating steps executed by an exemplary controller to reverse the rotational direction of a motor in an exemplary polishing apparatus of the present invention.

FIG. 7 shows a flow chart for exemplary detailed steps taken in block 548 in setting the parameters for the current instruction. The process starts at 600 and ends at block 612. At 602, a motor "off" signal is sent to port 334 if the direction of motor assembly 132 is to be reversed, a motor "off" signal is sent to port 336 if the direction of motor assembly 134 is to be reversed. Then there is a pause of approximately 3 seconds at 604 to enable each motor which is to be reversed to reduce its speed to zero. At block 606, new motor rotation directions are output to ports 335 and 337 as specified by the S.C. instruction. Thereafter, at 608, a motor "on" signal is output to ports 334 and 336, if specified by the settings of the S.C. instruction, to begin rotation of the motor assemblies 132 and 134. At block 610, timer 320 is set with the time period in the second field of the S.C. instruction.

In the polishing methods of the present invention, slurry is dispensed upon a polishing pad, which is preferably disposed on a platen, and thereafter, the sample is polished against the polishing pad. The sample is polished by rotating one of the polishing pad (by rotating the platen upon which the polishing pad is disposed) and the sample (by rotating the sample holder which holds the sample) with respect to the other about a first axis with the sample against the pad to effect polishing.

In a preferred embodiment, the polishing pad (as well as the platen upon which the polishing pad is disposed) is rotated about a first axis which is substantially perpendicular to the upper surface (i.e., the polishing surface) of the platen and the polishing pad in either a clockwise or counterclockwise direction while the sample holder (as well as the sample held by the sample holder) is rotated about a second axis which is substantially perpendicular to the polishing surface of the sample in either a clockwise or counterclockwise direction.

In a preferred embodiment the first and second axis are parallel. Also in a preferred embodiment, the polishing pad and the sample are rotated in opposite directions to more efficiently effect polishing.

In one embodiment of the method of the present invention, the distance between the sample and the polishing pad is intermittently changed during the polishing step (e.g., polishing cycle) by intermittently moving the sample away from the polishing pad. In a preferred embodiment, the sample is periodically moved away from and towards the polishing pad every 15 to 75 seconds during the polishing process. Also in a preferred embodiment, the rotational direction and/or speed of either the sample, the polishing pad, or both the sample and polishing pad is changed after the sample and polishing pad are moved away from one another and returned against one another. The motor speed may be changed by keeping a motor off during an S.C. instruction. Motor speed may also be changed by varying the magnitude of the voltage applied to a DC motor, and the chart of FIG. 5 may be expanded to include motor speeds as additional fields, and the execution program shown in FIG. 6 may be expanded to read these fields and generate appropriate control signals to the motor assemblies. For example, the DC motors may be controlled with the use of a programable DC voltage source. The addition of the speed fields enables the user to ramp the speeds during the polishing process by gradually incrementing (or decrementing) the speed values in the speed fields.

In a preferred embodiment, the sample and polishing pad are moved away from each other, the direction of rotation of one or both of the polishing pad and the sample are changed, and the sample and polishing pad are returned against one another at least two times during the polishing process.

In another embodiment, the rotational direction of one of or both the polishing pad and the sample is intermittently reversed. The rotational speed of one of or both the polishing pad and the sample may also intermittently changed, such as by turning off a motor assembly during an S.C. instruction, or by using speed fields as described above. In a preferred embodiment, at least one rotational direction is reversed periodically at a period of approximately 15 to 75 seconds. The rotational speed of the sample and/or polishing pad may be increased upon reversing the rotational direction of the sample and/or polishing pad. More specifically, the rotational speed is increased after moving the sample away from the polishing pad and before returning the sample toward the polishing pad.

Figure 8:
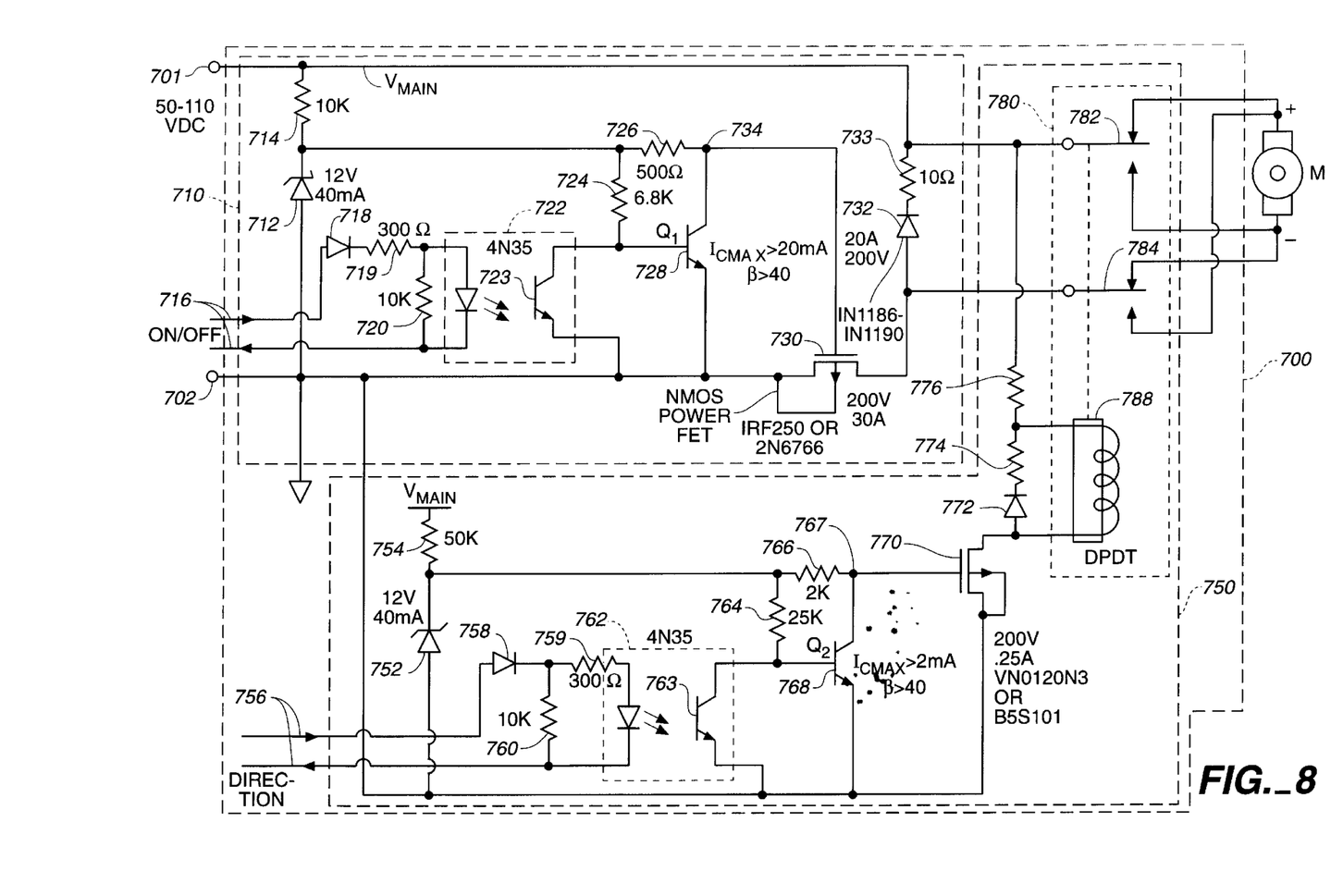
FIG. 8 is a circuit diagram of an exemplary motor control circuit of the present invention.

FIG. 8 is a circuit diagram of an exemplary motor control circuit of the present invention. Motor control circuit 700 comprises ON/OFF control circuit 710 and rotation direction control circuit 750. ON/OFF control circuit 710 controls the ON/OFF state of motor M, such as motor 132 or 134, whereas rotation direction control circuit 750 controls the direction in which motor M rotates.

ON/OFF control circuit 710 receives a source of high-voltage power (e.g., 50–110 VDC) for DC motor M at its power input terminals 701 and 702. As shown in FIG. 8, motor M is coupled to terminals 701 and 702 by way of a power switching transistor 730, and a double-pole, double-through (DPDT) switch 780. DPDT switch 780 is used to reverse the polarity of the voltage applied to motor M by exchanging the connections of the motor's terminals, thereby changing the motor's rotation direction. DPDT switch 780 will be described in greater detail below. Power switching transistor 730 is used to selectively close the circuit between the input terminals 701 and 702 and DPDT switch 780 and motor M, and preferably comprises an n-channel FET. When power switching transistor 730 is in its ON (or conducting) state, power is delivered to motor M. When transistor 730 is in its OFF state, power is not delivered to motor M. A series combination of a freewheeling diode 732 and resistor 733 is coupled across the terminals of motor M (to the left of DPDT switch 780) to provide a current conduction path for the inductive motor current whenever transistor 730 is turned off. Such freewheeling circuits are well known to the art, and readily implemented by those of ordinary in skill in the art. However, it is important to place the freewheeling circuit at the power side (shown as the left side in the figure) of DPDT switch 780 rather than the motor side, otherwise power will short through the freewheeling circuit which DPDT switch is reversed.

The conduction state of power transistor 730 is determined by its gate voltage, which in turn is controlled by a signal provided at a port 716, which receives the ON/OFF control signal for the motor from controller 300 (or 130). The voltage of the ON/OFF signal at port 716 is generally below 12V, and typically 5 volts and less. At least 8 volts are required to be applied to the gate of transistor 730 to put the transistor in a fully conductive state (the threshold voltage of FET power transistors is typically around 4 volts for an n-channel FET). Accordingly, the signal from port 716 should be amplified before applying it to the gate of transistor 730. Also, because the ground reference for the signal at port 716 may be different than the ground voltage at terminal 702, the signal should be translated so as to be referenced to the ground level provided at terminal 702. There are a number of ways of achieving the amplification and translation, one of which is illustrated below. The present invention is not limited to any particular way of achieving the aforementioned amplification and translation.

To achieve translation to the ground reference of terminal 702, the signal at port 716 is provided to an opto-isolator (or opto-coupler) 722 by way of diode 718 and two resistors 719 and 720. Opto-isolator 722 comprises a light-emitting diode (LED) which emits light on the base of a photo-transistor 723 when sufficient voltage is applied to it. When the LED diode is lit, photo-transistor 723 is enabled to conduct current between its collector and emitter. When LED diode is not lit, no such current can be conducted. The signal is thereby transmitted from one circuit to another by light, and transistor 723 may be included in a circuit which has a different ground reference than the LED diode. In this case, transistor 723 is part of a circuit which is referenced to the ground provided by terminal 702. Resistor 719 limits the current that can pass through the LED diode, and diode 718 and resistor 720 improve the noise immunity of the circuit by increasing the threshold voltage needed by the ON/OFF signal at port 716 to light the LED diode.

The signal from photo-transistor 723 is amplified by a circuit formed by a transistor 728 (Q1), and two resistors 724 and 726. Resistor 724 is coupled between the low voltage power (12V) provided by Zener diode 712 and the collector of phototransistor 723, and forms a first inverting amplifier with transistor 723. The output of this first inverting amplifier, which is at the collector of transistor 723, is provided to the input of a second inverting amplifier formed by resistor 726 and transistor 728. The output of the second inverting input is at the collector of transistor 728, also indicated as node 734, and is provided to the gate of power transistor 730. Thus, the optical signal provided to the gate of photo-transistor 723 is sent through two inverting amplifiers, thereby causing power transistor 730 to turn on (positive gate voltage) when light is at the base of transistor 723, and causing transistor 730 to turn off when there is no light.

Because resistor 714 and Zener diode 712 provide a limited amount of current ($I_{MAX}=(V_{MAIN}-12V)/R_{714}$), the ordinary design care should be taken to ensure that the maximum amount of current drawn by transistor 728 (Q1) is not so large that the first inverting amplifier is not able to drive transistor 728 (Q1). This may be achieved by proper selection of values for resistors 724 and 726 based on the maximum current $I_{MAX}$ and the minimum current gain ($\beta$) of transistor 728. The maximum current draw occurs when transistor 723 is off and transistor 728 is on. The value of resistor 726 may be chosen assuming that the $V_{CE}$ of transistor 728 is zero, that resistor 726 passes all of $I_{MAX}$, and that the voltage drop across resistor 726 under this condition is around 5 volts. These assumed conditions are reasonable, and give a value for resistor 726 of $R_{726}=5V/I_{MAX}$. The assumed conditions require a minimum base current of $I_{MAX}/\beta$, which is supplied by resistor 724. The value of resistor 724 is chosen such that it provides 2–3 times the minimum base current, assuming that the supply voltage is at 5V (thus $R_{724}<\frac{1}{2}*(5V-0.7V)/(I_{MAX}/\beta)$). The value of $I_{MAX}$ is of course selected by choosing the value of resistor 714. $I_{MAX}$ should be chosen such that its magnitude is sufficient to charge the gate of transistor 730 in a reasonably short amount of time (usually less than 10–50 microseconds), given the turn-on charge requirement of the transistor (usually around 100 nC). Exemplary component values are provided in FIG. 8.

Direction control circuit 750 comprises DPDT switch 780, briefly described above, and controls the state of DPDT switch 780, which in turn controls the direction of the motor's rotation. Switch 780 has a winding 788 and two armatures 782 and 784, which toggle between respective upper and lower contacts. Armatures 782 and 784 normally rest against their respective top contacts when winding 788 is not energized, and toggle to their respective bottom contacts when winding 788 is energized. The top contact of armature 782 is coupled to the positive terminal of motor M, and the bottom contact thereof is coupled to the negative terminal of motor M. The contacts of armature 784 are coupled in the opposite manner, the top contact being coupled to the negative terminal and the bottom contact being coupled to the positive terminal. Thus, when winding 788 is not energized, armature 782 couples the motor's positive terminal to terminal 701 and armature 784 couples the motor's negative terminal to power transistor 730 (and onto terminal 702 when transistor 730 is conducting). When winding 788 is energized, the reverse coupling occurs with armature 784 coupling the motor's positive terminal to power transistor 730 and armature 782 coupling the motor's negative terminal to terminal 701. The reversal of voltage polarity to the motor, which occurs when winding 788 is energized, reverses the direction of the motor's rotation.

Power to winding 788 is controlled by a resistor 776 and a transistor 770 coupled in series with winding 788, the so-formed series combination being coupled between power terminals 701 and 702. Transistor 770 operates in a similar manner to power switch 730 (but at a much lower current level), causing current to flow through winding 788 when it is in an ON state, and blocking current flow when it is in an OFF state. Resistor 776 limits the current and voltage provided to winding 788. A series combination of a freewheeling diode 772 and resistor 774 is coupled across the terminals of winding 788 to provide a current conduction path for the inductive winding current whenever transistor 770 is turned off. Such freewheeling circuits are well known in the art.

The conduction state of transistor 770 is determined by its gate voltage, which in turn is controlled by a signal provided at a port 756, which receives the direction control signal for the motor from controller 300 (or 130). The voltage of the direction signal at port 756 is generally below 12V, and typically 5 volts and less. Like the ON/OFF signal at port 716, the direction signal at port 756 may have a different ground reference than that provided by ground 702. For design convenience, the same type of driver circuit used in ON/OFF control circuit 710 (opto-coupler and two inverting amplifiers) is used in direction control circuit 750 to drive the gate of transistor 770 based on the signal at port 756. The topology of the drive circuit is the same, but some of the component values are different because a lower amount of current is required to turn on drive transistor 770. The reference numbers of the drive components are 752, 754, 758–760, 762–764, and 766–768, and may be readily corresponded to the drive components of ON/OFF control circuit 710. Exemplary component values are shown in FIG. 8.

In a preferred embodiment of the present invention, a first and second motor control circuits, such as motor control circuit 700, are coupled to the motors of drive assemblies 132 and 134, respectively. Therefore, the direction of rotation and the ON/OFF status of motors 132 and 134 are independently controlled by separate motor control circuits.

While the present invention has been particularly described with respect to the illustrated embodiments, it will be appreciated that various alterations, modifications and adaptations may be made based on the present disclosure, and are intended to be within the scope of the present invention. While the invention has been described in connection with what is presently considered to be the most practical and preferred embodiments, it is to be understood that the present invention is not limited to the disclosed embodiments but, on the contrary, is intended to cover various modifications and equivalent arrangements included within the scope of the appended claims.

What is claimed is:

1. An apparatus for polishing a sample having a surface to be polished, said apparatus comprising:

a platen having an upper surface;

a sample holder disposed opposite to said platen's upper surface, said sample holder having a first position which brings the sample in contact with the platen, and a second position which separates the sample from contact with the platen; and means for varying the position of the sample holder a plurality of times in the range between said first and second positions during a polishing cycle and for separating the sample from contact with the platen at a plurality of times during said polishing cycle.

2. The apparatus of claim 1 wherein the position of the sample holder is intermittently changed between said first and second positions a plurality of times during a polishing cycle.

3. The apparatus of claim 1 wherein said means for varying the position of the sample holder comprising a positioner mechanically coupled to said sample holder, said positioner capable of moving said sample holder between said first and second positions.

4. The apparatus of claim 3 wherein said positioner comprises an expandable fluid chamber and at least one spring, said at least one spring biasing said sample holder to one of said positions, said expandable fluid chamber moving said sample holder toward the other of said positions when fluid is coupled to it.

5. The apparatus of claim 1 further comprising a motor assembly coupled to one of said sample holder and said platen to rotate it about a first axis, and wherein the rotational direction of said motor assembly is intermittently changed during the polishing cycle.

6. An apparatus for polishing a sample having a surface to be polished, said apparatus comprising:

a platen having an upper surface upon which the sample surface is to be polished;

a sample holder disposed opposite to said platen's upper surface, wherein at least one of the platen and the sample holder is rotatable about a first axis to effect polishing;

a positioning means for changing the vertical distance between the sample holder and the platen in response to a control signal, said positioning means being capable of changing the vertical distance between a first value which brings the sample in contact with the platen, and a second value which separates the sample from contact with the platen; and a controller for generating said control signal during a polishing cycle, wherein said controller generates said control signal to cause said positioning means to change said vertical distance intermittently in a range between said first and second values during said polishing cycle such that the sample is separated from contact with the platen at a plurality of times during said polishing cycle.

7. The apparatus of claim 1 wherein said controller causes said positioning means to change said distance at a plurality of predetermined times during said polishing cycle.

8. The apparatus of claim 1 wherein said platen is rotated about said first axis, and wherein said apparatus further comprises a first motor drive assembly coupled to said platen to rotate said platen about said first axis, and wherein said controller causes said first motor drive assembly to intermittently reverse the rotational direction of said platen.

9. The apparatus of claim 8 wherein said controller causes said first motor drive assembly to intermittently reverse the rotational direction of said platen at a plurality of predetermined times during said polishing cycle.

10. The apparatus of claim 9 wherein at least three of said predetermined times are at periodic intervals.

11. The apparatus of claim 8 further comprising a second motor drive assembly coupled to said sample holder to rotate said sample holder about a second axis, and wherein said controller causes said second motor drive assembly to intermittently reverse the rotational direction of said sample holder.

12. The apparatus of claim 1 wherein said platen is rotated about said first axis, and wherein said apparatus further comprises a first motor drive assembly coupled to said platen to rotate said platen about said first axis, wherein said controller causes said first motor drive assembly to intermittently vary the rotational speed of said platen.

13. The apparatus of claim 1 wherein said sample holder is rotated about said first axis, and wherein said apparatus further comprises a first motor drive assembly coupled to said sample holder to rotate said sample holder about said first axis, and wherein said controller causes said first motor drive assembly to intermittently reverse the rotational direction of said sample holder.

14. The apparatus of claim 13 wherein said controller causes said first motor drive assembly to intermittently reverse the rotational direction of said sample holder at a plurality of predetermined times during said polishing cycle.

15. The apparatus of claim 1 wherein said sample holder is rotated about said first axis, and wherein said apparatus further comprises a first motor drive assembly coupled to said sample holder to rotate said sample holder about said first axis, and wherein said controller causes said first motor drive assembly to intermittently vary the rotational speed of said sample holder.

16. An apparatus for polishing a sample having a surface to be polished, said apparatus comprising:

a platen having an upper surface upon which the sample surface is to be polished;

a sample holder disposed opposite to said platen's upper surface;

a first motor drive assembly which rotates one of the platen and the sample holder about a first axis to effect polishing, said first motor drive assembly being responsive to a direction control signal having a first state to indicate a clockwise rotation and a second state to indicate a counter-clockwise rotation, and wherein said first motor assembly rotates said one of the platen and the sample holder in the clockwise direction when said direction control signal is in its first state, and in the counter-clockwise direction when said direction control signal is in its second state;

a controller for generating said direction control signal during a polishing cycle, wherein said controller generates said direction control signal to cause said first motor drive assembly to intermittently change rotational directions during said polishing cycle.

17. The apparatus of claim 16 wherein said first motor drive assembly rotates said sample holder.

18. The apparatus of claim 16 wherein said first motor drive assembly rotates said platen.

19. The apparatus of claim 16 wherein said controller causes said first motor drive assembly to intermittently reverse the rotational direction about said first axis at a plurality of predetermined times during said polishing cycle.

20. The apparatus of claim 19 wherein at least three of said predetermined times are at periodic intervals.

21. The apparatus of claim 16 wherein said first motor drive assembly rotates said platen about said first axis, wherein said apparatus further comprising a second motor drive assembly which rotates said sample holder about a second axis, said second motor drive assembly being responsive to a second direction control signal having a first state to indicate a clockwise rotation and a second state to indicate a counter-clockwise rotation, and wherein said second motor assembly rotates said sample holder in the clockwise direction when said second direction control signal is in its first states and in the counter-clockwise direction when said second direction control signal is in its second state, and wherein said controller generates said second direction control signal during said polishing cycle to cause said second motor drive assembly to intermittently change rotational directions during said polishing cycle.

22. An apparatus for polishing a sample having a surface to be polished, said apparatus comprising:

a platen having an upper surface; and a sample holder disposed opposite to said platen's upper surface, wherein one of the platen and the sample holder is rotated with respect to the other; and wherein the direction of rotation of one of the platen and the sample holder is varied a plurality of times during a polishing cycle.

23. In a apparatus for polishing a sample having a surface to be polished, said apparatus comprising a platen having an upper surface, a sample holder disposed opposite to said platen's upper surface, a positioner which moves the sample holder between a first position which brings the sample in contact with the platen and a second position which separates the sample from contact with the platen in response to a control signal, a controller comprising:

an output port capable of providing a control signal to the positioner;

a memory for holding a sequence of position instructions and corresponding time periods to be used to direct the operation of the positioner between said first and second positions during a polishing cycle, a plurality of said instructions directing the positioner to separate the sample from contact with the platen at a plurality of times during said polishing cycle;

a timer providing an electronic signal representative of time; and a processing unit which generates control signals at said output port in response to the sequence contents of said memory and the output of said timer.

24. In an apparatus for polishing a sample having a surface to be polished, said apparatus comprising a platen having an upper surface, a sample holder disposed opposite to said platen's upper surface, a motor assembly for rotating one of the sample holder and the platen in either of two directions, the direction being selectable in response to a control signal; a controller comprising:

an output port capable of providing a control signal to the apparatus for the motor assembly;

a memory for holding a sequence of rotation directions and corresponding time periods to be used to direct the operation of the motor assembly by said controller;

a timer providing an electronic signal representative of time; and a processing unit which generates control signals at said output port in response to the sequence contents of said memory and the output of said timer.

* * * * *